Sept. 23, 1947.  W. D. CARSON  2,427,764

VENT PLUG

Filed Sept. 13, 1944

INVENTOR
William D. Carson
BY
Spencer, Hardman & Feho
His ATTORNEYS

Patented Sept. 23, 1947

2,427,764

UNITED STATES PATENT OFFICE 2,427,764

VENT PLUG

William D. Carson, Muncie, Ind., assignor to General Motors Corporation, Detroit, Mich., a corporation of Delaware Application September 13, 1944, Serial No. 553,831

6 Claims. (Cl. 277—44)

This invention relates to storage batteries and more particularly to vent plugs for the cells of the storage battery.

It has heretofore been customary to equip storage batteries with vent openings in the plugs which close the filler openings of the storage battery, to allow the escape of gas which is generated in the storage battery. So long as the battery is not subjected to abnormal conditions this arrangement has proven satisfactory, but with varied new conditions met with in the use of batteries, a battery is likely to be submerged in water thus allowing water to enter the cells of the battery through the vent plugs. It is well known that if water, such as sea-water, enters the storage battery cells and comes into contact with the electrolyte, gases are formed and given off which are disagreeable to persons in the vicinity of the battery.

It is an object of the present invention to provide a vent closure plug for the filler openings of batteries which will permit proper venting to atmosphere of gases generated in the battery when the battery is used in the customary manner or when the battery is submerged in a liquid without allowing water to enter the cells to damage the electrolyte.

A further object is to provide a gas relief mechanism which is positive in action, readily replaced without disassembling the storage battery, and which does not complicate or increase the cost of manufacture of the cell cover.

Further objects and advantages of the present invention will be apparent from the following description, reference being had to the accompanying drawings wherein a preferred embodiment of the present invention is clearly shown.

Figure 1:
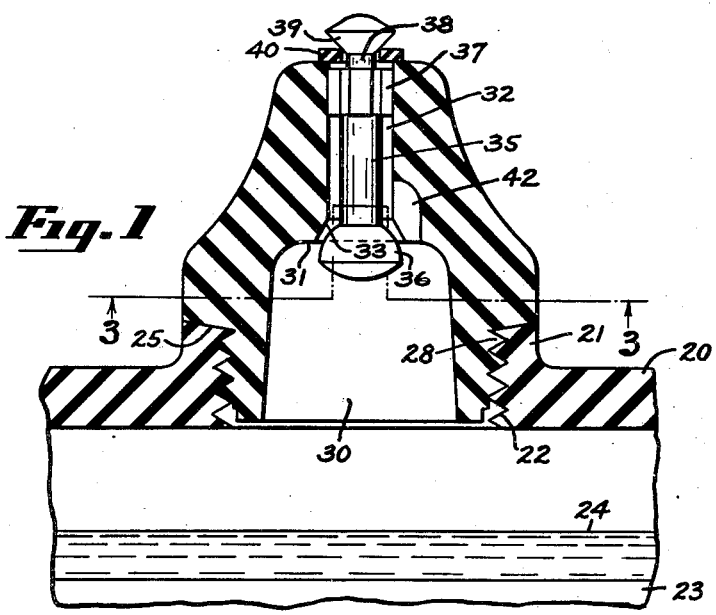
Fig. 1 is a vertical section through the improved plug showing it in its normal position.
Figure 3:
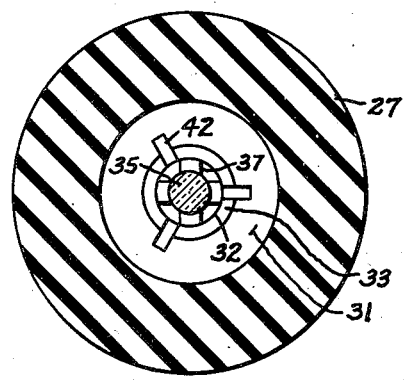
Fig. 3 is a sectional view taken on the horizontal line portions of line 3—3 of Fig. 1.

Referring to the drawing, 20 designates a top wall of a cell closure or cover having an apertured boss 21 which is internally threaded as at 22. The apertured boss provides the means by which electrolyte and water are poured into the cell about plates or separators 23 within the cell. The normal level of which is designated by the reference character 24. The upper end of the boss 21 is provided with a seat tapered inwardly as at 25.

The filler opening is adapted to be closed by a vent plug assembly 26. This vent plug assembly comprises a hollow body 27 having a reduced portion provided with external threads 28 and a tapered portion 29 to register with the tapered seat of the boss. Thus, when the plug is attached to the cover the thread portions of the plug and cover cooperate to draw firmly the tapered portion 29 against the tapered seat 25 to form a tight seal to prevent liquid from passing between the threads.

The hollow body 27 includes a cavity 30 which extends upwardly a certain distance from the lower end of the body to provide a shoulder 31. The body is also provided with a bore or orifice 32 which extends from the shoulder 31 to the top of the body. The lower end of the bore is enlarged to provide a stop 33. The bore 32 acts as a guide for a valve mechanism which includes a stem 35 made of suitable plastic material such as hard rubber or the like. The stem is provided at its lower end with a spherical head 36 which cooperates with the stop 33 to limit the upward travel of the stem.

The valve stem 35 extends upwardly through the bore with the upper end thereof provided with ribbed or fluted portion as at 37 so that the stem will be guided in the bore 32. In the present instance the stem is shown with four ribs, but it is to be understood that any number of ribs may be used. The stem is slightly reduced above the top of the ribbed portion 37 to provide a neck portion 38. Above the neck portion the stem is provided with a conical enlargement 39. The neck portion 38 is surrounded by a movable valve member 40 in the form of an apertured disc made of soft rubber or equivalent soft plastic material. The diameter of the aperture in the disc 40 is greater than the diameter of the neck portion 38 to provide a small vent to permit passage of gases between the neck and the marginal wall of the aperture in the disc 40. It is rather important that the soft rubber or plastic material comprising the disc is made of a composition so that when the aperture is formed in the disc a sharp edge or corners will prevail to assure line contact between the conical surface on the enlargement 39 and the sharp edge or corners. The soft rubber disc 40 in this instance is forced over the enlargement 39 after the valve stem has been pushed through the bore 32. When the disc surrounds the neck portion 38 it will hold the stem in assembled relation with the body 27. It will be noted the thickness of the disc 40 is less than the length of the neck portion 38 so as to provide a lost motion connection between the stem and the disc.

After the disc 40 is forced over the enlargement the stem is free to move downwardly by gravitation causing the disc and the enlargement to seal the bore 32, due to the fact that the underside of the washer is forced against a flat seat 41 surrounding the bore 32 and the conical surface of the enlargement 39 makes line contact with the upper sharp edge or corner of the aperture in the disc. Since the disc is of soft material the weight and the downward force exerted by the stem has a tendency to push the disc 40 into the bore 32.

It is quite important that a highly efficient valve seating action be obtained, that is, that the valve member 40 firmly engages the flat surface 41. This is accomplished by a film of electrolyte between the surface 41 and the disc 40. This film provides surface tension between the disc 40 and the surface 41 and is strong enough to hold the disc 40 securely in place even though the exposed surface of the disc 40 is greater than the exposed area of the enlargement 39 and the weight is less. It is pointed out here that surface tension between two flat surfaces, especially with a film of liquid therebetween is very pronounced whereas the surface tension between a conical portion and a sharp edge (a point contact), is negligible.

Figure 2:
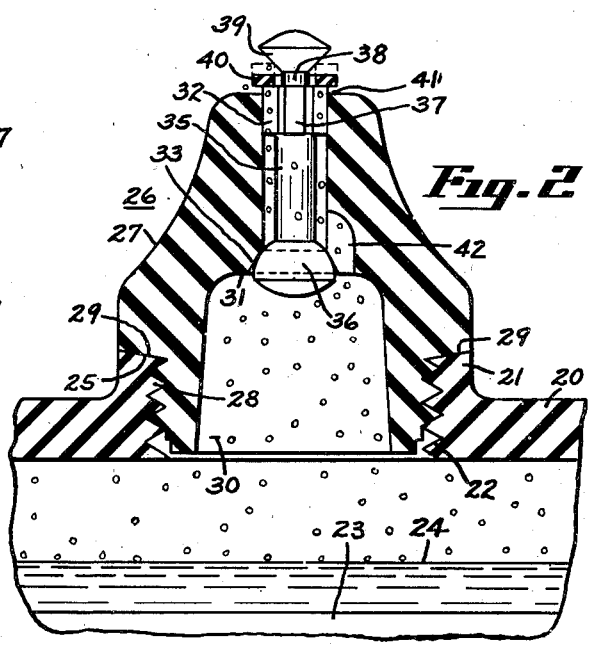
Fig. 2 is a view similar to Fig. 1 but showing the valve in its venting position.

With a container or battery equipped with a vent plug of the type disclosed the operation is as follows: The valve mechanism 26 normally closes the bore 32, so that any gas which may be generated within the cell will accumulate above the electrolyte. As soon as the gas pressure is sufficient to elevate the valve stem the conical portion of the enlargement 39 will first move out of contact with the disc 40 due to the fact that the conical portion has only line contact with the sharp edge provided by the aperture in the disc. When the conical portion 39 leaves the sharp edge the gases will pass through the space between the neck 38 and the marginal wall of the aperture in the disc 40. Further upward movement of the stem, due to exceedingly high pressures, will cause the ribbed portion 37 on the stem 35 to lift the disc 40 from the seat 41 as shown in Fig. 2. When this happens a film of electrolyte will cover the surface 41. The movement of the stem 35 in the upward direction is limited by the head 36 engaging the stop 33. To assure that the cell will be vented when the head 36 engages the stop 33 the bore is provided with a plurality of spaced slots 42 to provide a communication between the bore 32 and the cavity 30. It is to be understood, however, that the head could be formed with suitable passages to provide the necessary communication between the space below the shoulder 31 and the bore 32.

One of the main features of the present invention is to provide venting of the cells in a battery which might be submerged in a liquid. This may occur in cases where storage batteries are used in small ships, or in airplanes supplied with a portable radio set which might be sunk or fall in a body of water. It is customary when ships are sunk or damaged to throw the radio set overboard and subsequently pick it up for sending messages, and at such times, the set may be submerged. In such instances the present invention will prevent water from entering the cells, because pressure of the water against the valve stem and pliable disc will make a fluid-tight seal. During the time the battery is submerged the disc 40 will be firmly pressed down against the surface 41 with a column of water, equal to the total area of the washer, including that portion which lies over the cap 26, but will be lifted up by gas pressing only on the area between the neck 38 and the wall of bore 32. Whereas stem 35 will be both pressed down and lifted up by pressures on equal areas, that is, equal to area of hole in the washer 40. In case the battery is gassing the seal will remain tight until the internal pressure exceeds the external water pressure. When this happens the valve stem will first move upwardly a slight distance and allow the gas to escape. When the internal pressure is relieved the valve again seals the bore 32 until the pressure is again above the external pressure and the process repeats itself.

While the embodiment of the present invention as herein disclosed, constitutes a preferred form, it is to be understood that other forms might be adopted, all coming within the scope of the claims which follow.

What is claimed is as follows:

1. A vent plug comprising a hollow body and having an orifice at the top, the outer surface of the plug surrounding the orifice forming a valve seat and having provisions at its lower end adapted to be fitted in an aperture of a container; a valve stem extending upwardly through the orifice, said stem having a ribbed portion adapted to cooperate with the marginal wall of the orifice to guide the stem in its movements and having a conical enlargement above the seat; a disc of pliable material having an aperture provided with a sharp edge and adapted to be forced over the enlargement and located between the enlargement and the ribbed portion, the aperture being greater in dimension than the stem portion between the ribbed portion and the enlargement to provide a venting space between the stem and the marginal wall of the aperture in the disc, said disc constituting means for holding the stem in assembled relation with the body, said stem being gravity actuated and adapted when the hollow body is in its normal upright position to cause the conical enlargement to make line contact with the sharp edge of the aperture to seal same and also apply pressure to the disc to urge the rim of same against the seat to close the orifice, said stem capable of being moved upwardly by pressures within the hollow body acting on said enlargement when said pressure is greater than external pressure to move the enlargement relative to the disc to break the sealing contact between the conical portion and the disc to provide a venting passage between the stem and the marginal wall of the aperture in the disc before the disc is lifted from the seat by the ribbed portion.

2. A vent plug comprising a hollow body and having an orifice at the top, the outer surface of the plug surrounding the orifice forming a valve seat and provided with a lower end adapted to be fitted into an opening of a container; a valve stem extending upwardly through the orifice, said stem having a ribbed portion adapted to cooperate with the marginal wall of the orifice to guide the stem in its movements and having a conical enlargement above the seat; an apertured resilient pliable disc loosely supported between the enlargement and the ribbed portion of the stem, said aperture capable of providing a small vent passage through the disc, said disc constituting means for holding the stem in assembled relation with the body, said stem being gravity-operated to permit the conical enlargement to have line contact with marginal wall of the aperture of the disc to seal the aperture and causing the enlargement to urge the rim of the disc against the seat to seal completely the orifice when the hollow body is substantially in an upright position, said stem capable of moving relative to the disc to break the line contact seal so as to provide the small vent passage between the stem and disc up to the time the disc is moved from the seat by the ribbed portion to provide a larger vent passage; and cooperating means provided by the stem and body for limiting the upward movement of the stem.

3. A vent plug comprising a hollow body adapted to be fitted within a filler opening of a container, the upper end of the body having a restricted bore for venting the hollow body; a gravity responsive valve stem extending upwardly through said bore, said stem having a fluted or guide portion capable of extending through the bore and having a conical enlargement spaced from the latter; and a substantially flat apertured valve member loosely carried by the stem between said guide portion and the lower side of the enlargement of the stem and adapted to be drawn against the top surface of the body by the enlargement of the stem to close firmly the bore and to hold the stem in assembled relation with the body, said valve member having an opening with a diameter greater than that of the stem between the enlargement and the fluted portion to provide a vent, said enlargement normally sealing the opening so as to close said bore, said enlargement and valve adapted to be moved progressively from their respective seats by pressure created within the hollow body for venting purposes.

4. A vent plug provided with a hollow body having a vent opening at the top and having provisions at the lower end adapted to be fitted into an opening of a container, said top having a plane outer surface about the opening forming a valve seat; a stem having a fluted portion extending into the opening and having a tapered portion spaced from ribbed portion and extending above the seat; an apertured flat member of yieldable material loosely carried by the stem between the tapered portion and the ribbed portion and adapted to be drawn against the seat to seal the opening when the stem drops by action of gravity, the aperture of the disc having a cross dimension which is greater than the stem whereby the tapered portion makes line sealing contact with the marginal wall of the aperture, the space between the disc and stem operating as a small vent passage for the hollow body, when the stem is moved upwardly relative to the disc by pressures within the hollow body to break the line contact seal, said vent prevailing until the ribbed portion is raised sufficiently to engage the disc to lift same from the seat to provide a larger vent passage; and means carried by the stem cooperating with means within the hollow body for limiting the upward movement of the stem.

5. A vent plug comprising a hollow body provided with an inwardly extending ledge defining a vent opening the outer side of the ledge forming a valve seat and the lower side forming a stop shoulder, said body having provisions at its lower end adapted to be fitted with an aperture of a container; a valve stem having an enlarged portion adapted to engage the shoulder, said stem having a ribbed guide portion capable of extending through the vent opening, and having a conical portion above the ribbed portion located above the seat; and a flat apertured valve member loosely supported by the stem between the guide portion and the conical portion and adapted to be forced into sealing relation with the valve seat by the stem when the stem drops by action of gravity, said conical portion having line contact with the washer to seal the aperture in the valve member, said aperture in the valve member forming a vent passage when the stem is moved upwardly relative to the valve member to break the line contact sealing engagement between the valve member and the conical portion of the stem.

6. A vent plug comprising a hollow body provided with an inwardly extending ledge at one end defining a relative large vent opening, the outer face of the ledge forming a valve seat; means for attaching the body over an opening of a container; a valve stem reciprocatory within the body and having an enlarged head for engagement with the underside of the ledge to limit outward movement thereof and having a ribbed guide portion capable of extending through the opening and having a conical portion spaced from the ribbed portion and located above the seat; and a flat apertured disc of resilient material loosely supported by the stem between the conical portion and the ribbed portion, whereby the hollow body may be vented through the space between disc and the stem, the construction and arrangement being such that when the stem drops by the action of gravity, when the plug is in a substantial upright position, the conical portion will make line contact with the marginal wall of the aperture to seal same and also to press the disc against the seat to seal the large vent opening, said stem capable of being actuated outwardly by pressures within the hollow body with the conical portion leaving the disc to provide a small vent passage before the ribbed portion lifts the valve from the seat to provide a large vent passage.

WILLIAM D. CARSON.

REFERENCES CITED

The following references are of record in the file of this patent:

UNITED STATES PATENTS

| Number | Name | Date |
| --- | --- | --- |
| 1,821,206 | Caswell | Sept. 1, 1931 |
| 287,908 | Connor | Nov. 6, 1883 |
| 1,612,845 | Wentorf | Jan. 4, 1927 |
| 1,514,670 | Melchior | Nov. 11, 1924 |
| 1,615,772 | Poole | Jan. 25, 1927 |
| 81,804 | Malone | Sept. 1, 1868 |
| 1,748,203 | Brunelle | Feb. 25, 1930 |

FOREIGN PATENTS

| Number | Country | Date |
| --- | --- | --- |
| 687,026 | Germany | Jan. 20, 1940 |
| 806,746 | France | Oct. 5, 1936 |